United States Patent Office 2,698,322
Patented Dec. 28, 1954

2,698,322

METHOD OF PREPARING SOLID NON-GELLED EASILY FILTERABLE CARBOXYMETHYLCELLULOSE FROM SOLID SODIUM CARBOXYMETHYLCELLULOSE

Clyde W. Leaf, Wyandotte, Mich., assignor to Wyandotte Chemicals Corporation, Wyandotte, Mich., a corporation of Michigan No Drawing. Application April 23, 1952,
Serial No. 283,988

3 Claims. (Cl. 260—232)

This invention relates to a method of preparing purified carboxymethylcellulose and, more particularly, to a purification procedure which comprises adding solid sodium carboxymethylcellulose containing not substantially more than 0.5 glycollic acid groups per glucose unit of cellulose to a 5–35% solution of sulfuric acid.

Carboxymethylcellulose is customarily manufactured in the form of its sodium salt by reacting alkali cellulose with sodium chloroacetate. The sodium carboxymethylcellulose that is obtained from this reaction is a technical grade product containing appreciable quantities of sodium chloride, sodium glycollate and other reaction impurities. While such technical grade product is satisfactory for many purposes, such as for use in synthetic detergents, it is often desirable to isolate carboxymethylcellulose in its free acid form. In theory at least, it should be easy to isolate the free carboxymethylcellulose by the acidification of its sodium salt. While free carboxymethylcellulose is obtained by such acidification, it is so badly gelled and swollen that it cannot be handled in ordinary filtration or centrifuge equipment.

The seriousness of the gelling of the free carboxymethylcellulose is illustrated by the complicated prior art processes that are used to obtain the free carboxymethylcellulose. For example, in U. S. 2,513,807 sodium carboxymethylcellulose is neutralized to a pH of just under 7, extruded into fine filaments having diameters less than 0.04 inch, dried to a moisture content of less than 5%, treated with a strong acid solution, washed and finally dried. The shortcomings of such unwieldy and complicated processes are apparent.

It is an object of this invention to provide a method for preparing free carboxymethylcellulose in a non-gelled easily filterable form.

Another object of this invention is to provide a process for purifying carboxymethylcellulose of a specified degree of substitution by acidification in dilute sulfuric acid solution.

Other objects and advantages of this invention will become apparent from the following detailed description thereof.

Notwithstanding the usual gelling action associated with the acidification of sodium carboxymethylcellulose, we have discovered that a non-gelled easily filterable free carboxymethylcellulose can be obtained by adding powdered sodium carboxymethylcellulose, the carboxymethylcellulose containing not substantially more than 0.5 glycollic acid groups per glucose unit of cellulose, to a 5–35% solution of sulfuric acid. If the undesired gelling is to be avoided, the following critical conditions must be observed in carrying out the process:

1. The sodium carboxymethylcellulose must not contain substantially more than 0.5 glycollic acid groups per glucose unit of cellulose,
2. The sodium carboxymethylcellulose must be employed in the form of a solid powder,
3. The sodium carboxymethylcellulose must be added to sulfuric acid, and
4. The concentration of sulfuric acid must be maintained within the limits of 5–35%, by weight.

The following examples are set forth to more specifically illustrate the principle and practice of this invention to those skilled in the art.

EXAMPLE 1

Part A

The crude sodium carboxymethylcellulose employed in this and subsequent examples contained 65% active agent, 7% water and the balance reaction impurities such as sodium chloride, sodium glycollate, etc. Throughout this application, unless otherwise specified, it will be understood that the sodium carboxymethylcellulose contained 0.48 glycollic acid groups per glucose unit of cellulose, as determined by the method of Eyler et al., Analytical Chem., 19 p. 24 (1947).

Twenty parts of the above described sodium carboxymethylcellulose was added to 80 parts of an 8% sulfuric acid solution with vigorous stirring. The resulting slurry of free carboxymethylcellulose was easily filtered on a Buchner funnel to give a crumbly non-gelatinous filter cake that was easily broken up and redispersed in water.

Part B

Twenty parts of the above described sodium carboxymethylcellulose was added to 80 parts of 10% hydrochloric acid with vigorous stirring. Unlike the results in Part A, the free carboxymethylcellulose was highly gelled and could be filtered only with the greatest difficulty to obtain a slimy gel-like filter cake that could not be broken up and redispersed into an aqueous slurry. Similar unsuccessful results were obtained when sodium carboxymethylcellulose was added to 10% nitric, phosphoric and acetic acid. This example demonstrates that sulphuric acid performs a highly specific function in this method.

EXAMPLE 2

A dilute (ca. 2%) aqueous solution of the sodium carboxymethylcellulose described in Example 1, Part A, was prepared and added to a dilute solution of sulfuric acid with vigorous stirring. It will be noted that this example differs from Example 1, Part A, only in that the sodium carboxymethylcellulose was added to the sulfuric acid as an aqueous solution rather than a dry powder. In marked contrast to the results of Example 1, Part A, however, the free carboxymethylcellulose was obtained in such a highly gelled state that it could not be filtered. This example illustrates that sodium carboxymethylcellulose must be added to the dilute sulfuric acid as a solid.

EXAMPLE 3

Example 1, Part A, was repeated except that the sodium carboxymethylcellulose employed contained 0.57 glycollic acid group per glucose unit of cellulose as determined by the method of Eyler et al. Analytical Chem., 19, p. 24 (1947). The resulting free carboxymethylcellulose was highly gelled and could not be filtered. This example demonstrates that the sodium carboxymethylcellulose that is added to the dilute sulfuric acid must not contain substantially more than 0.5 glycollic acid group per glucose unit of cellulose.

EXAMPLE 4

To illustrate the effect that the strength of sulfuric acid has upon the physical characteristics of the free carboxymethylcellulose, 20 parts of the sodium carboxymethylcellulose described in Example 1, Part A, was added to 80 parts of sulfuric acid of varying strengths. The results are set forth in the table below:

| Concentration $H_2SO_4$ Solution Weight Percent | Physical Condition Carboxymethylcellulose |
|---|---|
| 3.5 | Highly gelled, unfilterable. |
| 5 | Incipient gelling, but filterable. |
| 8 | Granular, easily filterable. |
| 35 | Do. |
| 44 | Highly gelled, unfilterable. |

Referring to the table, it will be seen that, if gelling is to be avoided, the sulfuric acid concentration must be at least about 5% and not substantially greater than 35%. Based solely upon considerations of the ease of filtering the free carboxymethylcellulose, it is preferred to use from about 8 to about 20% sulfuric acid concentration.

In actual practice, because of corrosion problems and other considerations, it is preferred to use sulfuric acid of approximately 10% strength.

What is claimed is:

1. A method for preparing carboxymethylcellulose in a non-gelled easily filterable form, which comprises adding solid sodium carboxymethylcellulose containing not substantially more than 0.5 gylcollic acid groups per glucose unit of cellulose to sulfuric acid having a concentration of at least about 5% and not substantially more than 35%, by weight.

2. The method of claim 1 wherein a concentration of about 8 to about 20% sulfuric acid is employed.

3. The method of claim 1 wherein a sulfuric acid concentration of about 10% is employed.

References Cited in the file of this patent

UNITED STATES PATENTS

| Number | Name | Date |
|---|---|---|
| 2,118,663 | Bradshaw | May 24, 1938 |
| 2,331,858 | Freeman et al. | Oct. 12, 1943 |
| 2,555,446 | Hutchinson | June 5, 1951 |